(No Model.)
P. F. FLEMING.
HAY RAKE.
No. 259,839. Patented June 20, 1882.
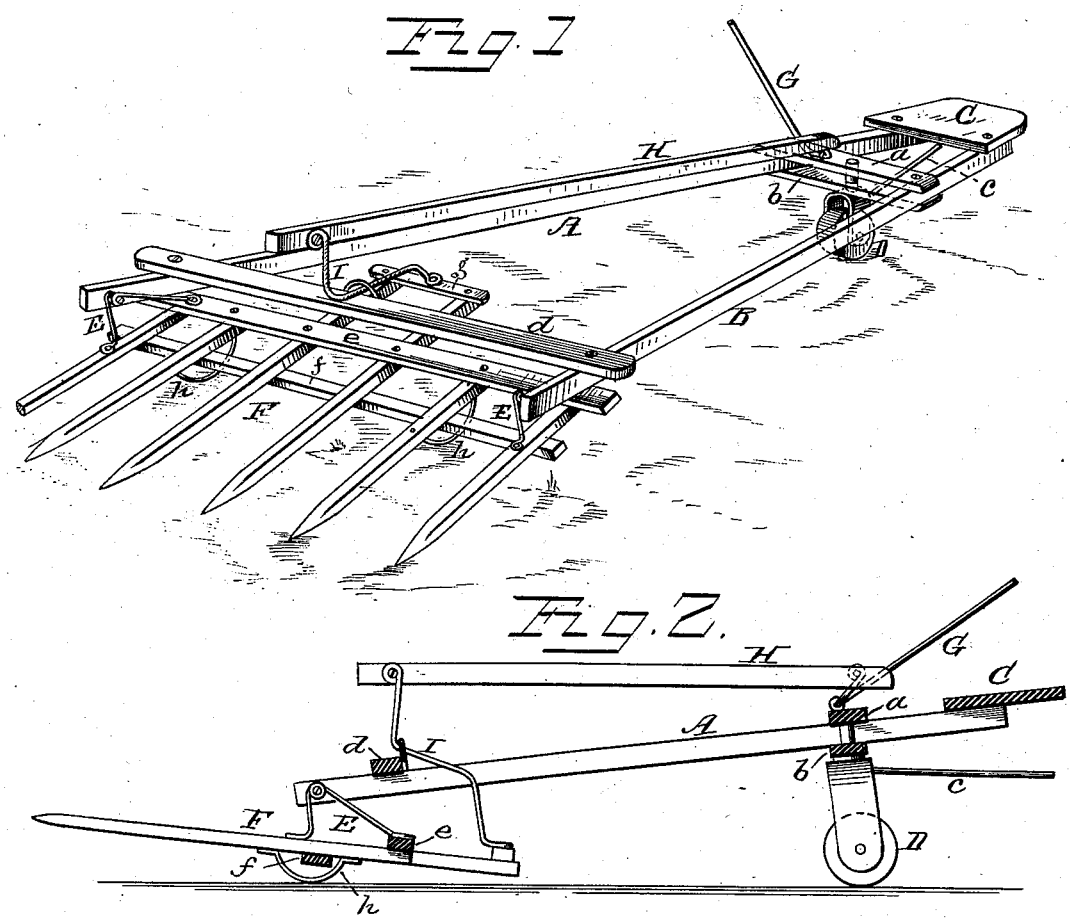
WITNESSES
Franck L. Ourand
L. L. Miller
INVENTOR
Peter F. Fleming,
per Chas. H. Fowler
Attorney

UNITED STATES PATENT OFFICE.

PETER F. FLEMING, OF SALISBURY, MISSOURI.

HAY-RAKE.

SPECIFICATION forming part of Letters Patent No. 259,839, dated June 20, 1882.

Application filed April 28, 1881. (No model.)

*To all whom it may concern:*

Be it known that I, PETER F. FLEMING, a citizen of the United States, residing at Salisbury, in the county of Chariton and State of Missouri, have invented certain new and useful Improvements in Hay-Rakes; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing the rake-teeth in position for taking the load; and Fig. 2 is a longitudinal section thereof with the teeth in an elevated position for carrying the load.

The present invention has relation to certain new and useful improvements in horse hay-rakes; and it consist in the details of construction substantially as shown in the drawings and hereinafter described and claimed.

In the accompanying drawings, A B represent two beams, disposed at an angle to each other, and at the rear end or apex of said angle formed by the beams are secured the driver's seat C and braces $a$ $b$, to the latter of which is connected or pivoted a small wheel or caster, D, having a rod, $c$, by which said wheel or caster may be controlled by the feet or hands of the driver, so that any direction may be given to the rake required.

The forward ends of the beams A B have secured to them a cross-brace, $d$, and upon the inner sides of said beams are pivoted spring-brackets E, bent in the form shown to give sufficient elasticity to the rake F, so that when coming in contact with any object—such as a stone or the like—the rake will yield sufficiently to pass over the obstruction without injury to the teeth.

The spring-brackets E have their ends secured respectively to the two outer teeth of the rake and to a cross beam or brace, $e$, connected upon the upper side of the teeth, and at their rear ends a second cross-brace, $f$, being secured to the under side of the teeth directly forward of the brace $e$.

A crank-handle, G, is journaled in suitable bearings secured to the cross-brace $a$, in convenient reach of the driver, the crank portion of said handle being connected to the central beam, H, which is of sufficient length to extend forward over the cross-brace $d$, as shown in Fig. 2.

To the end of the beam H, directly over the cross-brace $d$, is connected one end of a serpentine-formed rod, I, the opposite end of the rod being secured to the cross-piece $g$ upon the rear of the two central rake-teeth, so that connection is made between the rake F, beam H, and crank-handle G.

The beams A B, together with the braces, form an angular or V-shaped frame of sufficient width to allow the horses to walk one up each side of the beam H, which serves as tongue or guide for the horses.

If desired, the rake may be supported upon suitable wheels or runners, $h$.

The driver being mounted upon his seat, the crank lever or handle is pressed down, as indicated in Fig. 2, which will elevate the rake-teeth from contact with the ground, and when it is desired to bring the rake in position to receive or gather its load the crank-handle is pushed up and forward, lowering the teeth and bringing them in position to take their load, when the rake is elevated and the load carried off or from the meadow to the stack.

Having now fully described my invention, what I claim as new, and desire to secure by Letters Patent, is—

In a horse hay-rake, the V-shaped frame consisting of the beams A B, braces $d$ $a$ $b$, and the central beam, H, having connected thereto crank-handle G, in combination with the rake F, connected to the beams A B by spring-brackets E, and to the beam H by rod I, substantially as and for the purpose set forth.

In testimony that I claim the above I have hereunto subscribed my name in the presence of two witnesses.

PETER F. FLEMING.

Witnesses:
A. M. McCRAY,
BURTON G. FLEMING.